(12) United States Patent
Darnell

(10) Patent No.: US 8,757,560 B2
(45) Date of Patent: Jun. 24, 2014

(54) CABLE RETENTION DEVICE

(75) Inventor: Charles A Darnell, Ponchatoula, LA (US)

(73) Assignee: Wanaka Holdings, LLC, Ponchatoula, LA (US)

( * ) Notice: Subject to any disclaimer, the term of this patent is extended or adjusted under 35 U.S.C. 154(b) by 261 days.

(21) Appl. No.: 12/822,916

(22) Filed: Jun. 24, 2010

(65) Prior Publication Data

US 2011/0315829 A1 Dec. 29, 2011

(51) Int. Cl.
*F16L 3/00* (2006.01)

(52) U.S. Cl.
USPC ............... 248/63; 248/65; 248/68.1; 248/73; 248/74.1; 403/373; 174/68.1

(58) Field of Classification Search
USPC ............ 248/67.5, 65, 63, 74.1, 76.1, 226.12, 248/49, 58, 62, 68.1, 72, 73, 228.6, 230.6, 248/231.71, 220.21, 229.1, 229.15, 229.2, 248/229.25, 228.1, 230.1, 309.1, 316.1; 174/68.1, 65 R, 660; 439/527, 533; 403/345, 373
See application file for complete search history.

(56) References Cited

U.S. PATENT DOCUMENTS

| | | | | |
|---|---|---|---|---|
| 899,757 A | * | 9/1908 | Newhall | 403/215 |
| 1,994,003 A | * | 3/1935 | Moore | 24/135 L |
| 3,618,882 A | * | 11/1971 | Podedworny | 248/68.1 |
| 5,332,115 A | * | 7/1994 | Schafer | 220/608 |
| 5,992,802 A | * | 11/1999 | Campbell | 248/68.1 |
| 5,996,945 A | * | 12/1999 | Coles et al. | 248/68.1 |
| 6,105,216 A | * | 8/2000 | Opperthauser | 24/459 |
| 6,924,432 B1 | * | 8/2005 | Connors | 174/660 |
| 7,481,247 B2 | * | 1/2009 | Friedline et al. | 138/106 |
| 7,770,848 B2 | * | 8/2010 | Johnson et al. | 248/65 |
| 7,931,420 B2 | * | 4/2011 | Maffeis | 403/400 |
| 2002/0037193 A1 | * | 3/2002 | Gibbons et al. | 403/344 |
| 2007/0120022 A1 | * | 5/2007 | Trotter et al. | 248/49 |
| 2008/0230657 A1 | * | 9/2008 | Booth | 248/63 |

* cited by examiner

*Primary Examiner* — Todd M Epps
(74) *Attorney, Agent, or Firm* — Roy Kiesel Ford Doody & Thurmon, APLC

(57) ABSTRACT

A cable retention device is disclosed. The device may be used to restrain electrical cables routed along a cable support structure. These support structures are used in both internal and external settings, and the structures provide some physical support and protection to the electrical cables. In some high-power settings, these cables run from substations or electrical generators to a point within a facility. The support structures typically used in these settings do not fully restrain the cables. External forces, such as those that may occur during short circuit conditions, may result in movement of the electrical cables, which can lead to damage. Cable retention devices, referred to at times as cleats or clamps, are needed to restrain the cables. The cable retention device disclosed herein simultaneously restrains the cables and secures the cables to the cable support structure. The device comprises a base and cap that are secured to each other to enclose a part of the cables and the cable support structure.

18 Claims, 4 Drawing Sheets the present invention relates to a device for restraining insulated electrical cables. In particular, the invention relates to an improved cable retention device for use in connection with cable support structures that are used to physically support electrical cables being run through parts of electrical power generating stations, substations, manufacturing facilities, ships, offshore platforms, and other industrial settings.

CABLE RETENTION DEVICE

FIELD OF THE INVENTION

The present invention relates to a device for restraining insulated electrical cables. In particular, the invention relates to an improved cable retention device for use in connection with cable support structures that are used to physically support electrical cables being run through parts of electrical power generating stations, substations, manufacturing facilities, ships, offshore platforms, and other industrial settings.

BACKGROUND OF THE INVENTION

Electricity is ubiquitous to the modern industrial world. Manufacturing facilities and other industrial facilities require substantial electrical energy. To provide the necessary electrical energy to such facilities, electrical cables are needed. These cables may run from a substation or from electrical generators. But regardless of the source of the electrical energy, modern industrial facilities often involve extensive, and sometimes quite long, runs of large, insulated power supply electrical cables.

The cables used in these settings range greatly in size, varying in diameter from approximately 5 mm to greater than 150 mm. In most utility and industrial power supply cable runs, numerous cables are involved. A common arrangement found in these settings is the trefoil configuration, which includes three cables delivering a three-phase electrical power supply. The trefoil arrangement places two cables side-by-side at the base, with the third cable positioned above the other two, forming a sort of triangular cross-sectional shape. The trefoil arrangement is often used, resulting in groups of three cables run together in this roughly triangular arrangement. Groups of trefoil cables may be run or a mixture of cable arrangements may be involved.

The structures used to physically support these electrical cables take various forms. A common form of cable support structure resembles a ladder, with side rails providing substantial physical strength, and rungs extending from rail-to-rail. In this "ladder-type" structure, the cables are extended over the rungs. The cables may or may not be clamped or otherwise secured to the rungs. Groups of cables are typically secured together.

Different practices and standards have developed in Europe and North America for these types of cable runs. In Europe, electrical cables in these industrial cable runs must be secured to each other (i.e., restraining the cables from separating from each other) and to the cable support structures. To satisfy this requirement, the support structures used in Europe typically include rungs with slots or holes to facilitate the use of bolts for connecting cable clamps or cleats (these terms are used somewhat interchangeably, and the term "clamp" will be used herein to include all cable restraining devices of this type) to the rungs. These clamps, therefore, may be bolted directly to the rungs in many European industrial settings.

In North America, however, there are less explicit standards for securing cables to the cable support structures. Perhaps as a result, the cable support structures found in most industrial settings in North America do not include slots or holes in the rungs. This fact makes it difficult to secure cable restraints to the physical support structures. Adaptors have been developed for this purpose, but there remains a need for a better way to secure cables to each other and to the cable support structures used in North America.

Existing cable clamps also require that the electrical cables be lifted and inserted into the clamp. Perhaps because most clamps were developed to restrain cables to each other, the existing clamps are substantially easier to install when the clamps are not required to be secured to the rungs of a cable support structure. Most of the existing clamps require a two-step assembly. First, the clamp must be secured to the rung, typically using a through-bolt in the European industrial setting. Second, the cables must be lifted into the clamp, so that the clamp may then be fastened around the cables. This process may produce a secure arrangement if the clamp is sufficiently strong, but it requires a physically demanding and time consuming assembly process. These demands and difficulties are particularly challenging when there are multiple heavy cables involved. In some settings, the cables may weigh hundreds or even thousands of pounds.

The development of clamps used in these industrial settings has led to at least two shortcomings in the existing art. First, in all settings, including those where there is a ready means for securing the clamps to the rungs, the assembly process requires lifting and moving very large and heavy electrical cables. Second, in most settings in North America (and many other regions of the world) where the rungs have no slots or holes, there is a need for a better means for securing a clamp to the rung.

Some solutions used for securing cables together create risk of cutting the cable insulation. Metallic bands or straps have been widely used for this purpose. If the cables move over time, these types of bands or straps can cut into the insulation, possibly causing failure. It is, therefore, desirable to use a strong clamp that does not rely upon metallic bands or straps in direct, or close, contact with the cables.

The bands and straps described above use minimal space. Other solutions tend to take the opposite approach. Some clamping structures use large blocks of clamps in what is often identified as a cable bus arrangement. These clamps may work well at restraining cables, but require a large amount of space. In addition, if the cables must be lifted into the clamps, the large cable bus arrangement may require lifting cables several inches, or more, to position the cables within the clamps. This process of lifting the cables into the clamps can be time consuming and quite difficult to accomplish.

To fully appreciate the demands faced by these clamps, it is important to understand the magnitude of the forces that may result in the event of a short circuit. When a short circuit occurs, a very large instantaneous current results. Before a circuit breaker or other device may interrupt this current, the electrical cables through which the current flows will experience enormous physical forces. The magnetic fields generated by these large currents are extremely large and can result in flinging and whipping of the cables. When this happens, the cables experience very large axial, lateral, and torsional forces. The clamps needed to restrain cables under these conditions must be very strong. Thousands of pounds of force may exist in the cables during a short circuit situation.

Given these demands, there is a need for a cable restraining device that is capable of securing cables to each other and to the rung of a physical cable support structure whether the rung has slots or holes or no openings of either type. There is a further need for a restraining device that accomplishes these results without requiring excessive lifting or movement of electrical cables. There is need for a strong restraining device that is easy to install, sufficiently strong to restrain cables in even the most extreme short circuit conditions, and capable of being used with almost all types of physical cable support structures.

SUMMARY OF THE INVENTION

The present invention addresses the problems identified above. An improved cable retention device is disclosed. The device has two primary physical components, a base and a cap. In use, the base is positioned under or behind the rung of a physical cable support structure. The base has a support channel configured to extend around three sides of the cross-section of the rung. This provides a secure fit between the base and the rung.

The base also has one or more (preferably two) cable restraint surfaces perpendicular to the axis of the support channel and rung. In use, the support channel engages the rung and the cable restraint surfaces are in contact with the lower side of the cables that extend directly over the rung. Bolts, or other securing means, extend from the base.

The cap includes a cable restraint channel that is parallel to the axis of the electrical cables to be restrained. In use, the cap is placed over the cables and the base. The cap is then secured to the base, and the completed device simultaneously secures the cables to each other and to the rung. The cables need not be lifted or moved in order for this device to be used, which makes the present invention particularly suitable for retrofit applications.

In a preferred embodiment, the present invention includes a device for restraining one or more insulated electrical cables positioned upon a physical cable support structure, where the device includes a base configured to be positioned below the one or more insulated electrical cables and the physical cable support structure. The base in this embodiment may further include a support channel configured to engage a rung of the physical cable support structure, the support channel and rung being generally perpendicular to the longitudinal axis of the one or more insulated electrical cables. The device may also include one or more cable restraint surfaces configured to engage a lower surface of the one or more insulated electrical cables, the one or more cable restraint surfaces being generally perpendicular to the support channel. A cap may be included and may be configured to be positioned above the one or more insulated electrical cables and to engage an upper surface of one or more of the insulated electrical cables. Finally, a means for securing the base directly to the cap may be provided.

DETAILED DESCRIPTION OF THE DRAWINGS

Figure 1:
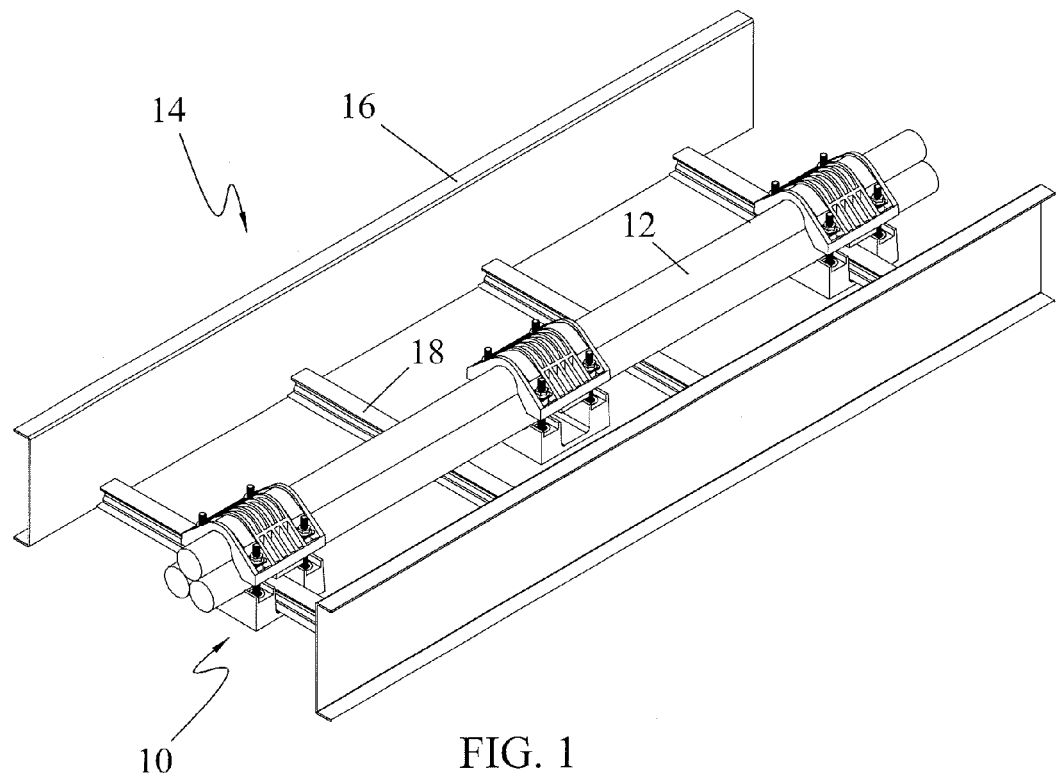
FIG. 1 is an isometric perspective view of a portion of a cable run using retention devices in accordance with the present invention.

An application using an embodiment of the present invention is shown in FIG. 1. A single trefoil cable run 12 is shown supported by a ladder-type physical cable support structure 14. The support structure 14 has large side rails 16 that extend longitudinally, and shorter rungs 18 that extend between the side rails 16. In actual use, the cable support structure 14 can be hundreds or even thousands of feet long. In addition, many industrial applications include multiple cable runs. There might be a number of sets of trefoil runs or numerous single cables separated by a few inches or more. The single trefoil cable run illustrated in FIG. 1 is not typical, but is shown to provide emphasis on the use of the cable retention device 10 of the present invention.

As shown in FIG. 1, the present invention can be used to simultaneously secure a set of cables 12 to each other and to a rung 18 of the cable support structure 14. The first and third cable retention devices 10 shown in FIG. 1 are used in this manner. The cable retention device 10 shown near the center of FIG. 1 is used to secure cables 12 to each other, but not to a rung 18. The present invention can be used in either manner, but is particularly suitable for securing one or more cables to a rung 18 of the cable support structure 14.

It should be noted that the cable support structure 14 shown in FIG. 1 is of the type commonly found in North America. The rungs 18 shown in FIG. 1 do not have holes or slots along their length. Rungs used in Europe, on the other hand, often do have holes or slots spaced along the rungs to allow clamps or other items to be bolted or fastened directly through the rungs. This type of perforated rung configuration is not common in North America. The present invention may be used with either type of physical cable support structure, but provides additional benefits when used with the solid rung design found in most industrial applications in North America.

Figure 2:
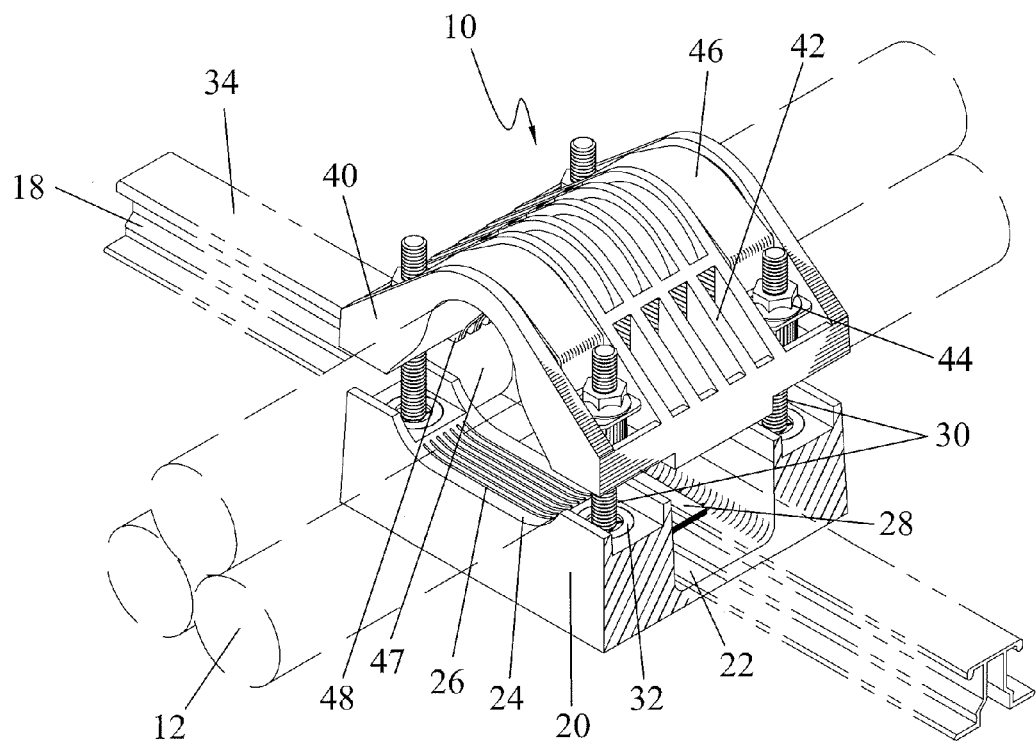
FIG. 2 is an isometric view of an embodiment of the present invention.

Turning to FIG. 2, a cable retention device 10 having a base 20 and cap 40 is shown. A cable support structure rung 18 and a group of cables in trefoil arrangement 12 are shown in dashed lines to illustrate the manner in which the cable retention device 10 may be used. The base 20 is positioned below both the rung 18 and the cables 12. The cap 40 is positioned above the cables 12 and rung 18. When the cap 40 and base 20 are secured to each other, the cables 12 are secured together and to the rung 18. As will be explained in more detail below, the present invention does not require movement of the cables 12 relative to the rung 18 during installation. Many existing clamps require that cables be lifted so that part of the clamp may be positioned between the rung and the cables. The present invention eliminates the need to lift or move the cables. This change is desirable, particularly in retrofit applications, as it reduces the time and labor required to install cable retention devices.

The base 20 shown in FIG. 2 has a support channel 22 that serves to secure the base 20 to a rung 18. The support channel 22 has three sides that extend around three sides of the rung 18. Cable restraint surfaces 24 in the base 20 are configured to press against the lower side of the cable or cables 12. In the embodiment shown in FIG. 2, there are ribs 26 in the cable restraint surfaces 24. The ribs 26 press slightly into the outer surface of the cable jacket when the base 20 is attached to the cap 40, and may provide a more secure clamping to the cables 12.

The cable restraint surfaces 24 are positioned on each side of the support channel 22. The cables 12 extend across (i.e., perpendicular to) the support channel 22 and rest upon the cable restraint surfaces 24. The cable restraint surfaces 24 create a type of channel in which the cables 12 rest. These surfaces 24 do not form a true channel, as there are two separate and longitudinally displaced cable restraint surfaces 24, as shown in FIG. 2. But when the device 10 is in use, the two cable restraint surfaces 24 form a pair of supporting surfaces positioned along the axis of the cables 12.

The configuration of the base 20 results in two primary supporting structures, one (i.e., the support channel 22) that engages around the rung 18, and another (created by the pair of cable restraint surfaces 24) that secures the device 10 to the lower side of the cables 12. The axes of these two supporting structures are generally perpendicular, just as the rung 18 and the cables 12 are generally perpendicular to each other in typical applications. The use of the modifier "generally" is intended to allow for slight variances from true perpendicular arrangements, as such variances are common. By providing perpendicular support structures within the unitary base 20, the present invention is able to simultaneously secure a group of cables to each other and to a cable support structure rung.

To create the perpendicular support structures, the cable restraint surfaces 24 may be formed out of the top surfaces of two sides of the support channel 22. As shown in FIG. 2, the base 20 has relatively thick sections along the sides of the support channel 22. These sections must be wide enough to allow bolts 30 to extend through them while still providing sufficient physical strength for the device 10. This result is achieved by using relatively wide side sections for the support channel 22, as can be seen in FIG. 2. The upper surfaces of these wide side sections include curved regions that form the cable restraint surfaces 24. These surfaces 24 are somewhat recessed and curved, again as shown in FIG. 2, which provides additional contact with the cables 12.

The lower side of the support channel 22 may include a sizing pad 28 used to better match the size of the support channel 22 to the size of a particular support rung 18. The sizing pad 28 may be of any suitable material, but an elastomeric material (e.g., rubber or neoprene) is preferred as such a material may compress and provide a good fit between the support channel 22 and the rung 18. The support channel 22 is sized to match typical rung sizes and shapes. If a good match exists, the sizing pad 28 is not needed. When used, the sizing pad may be attached to the support channel 22 using any suitable means, such as friction fit, pressure sensitive adhesive, spray on adhesive, tape, glue, or the like.

When a base is made in the manner shown in FIG. 2, the support channel 22 and the cable restraint surfaces 24 may be characterized as being perpendicular (or generally perpendicular) to each other. Though the cable restraint surfaces 24 are, in fact, part of the same physical structure that forms the support channel 22, the cable restraint surfaces 24 form a perpendicular support structure, as explained above. When the support channel 22 and the cable restraint surfaces 24 are characterized as being perpendicular, such a characterization is used to identify the type of structure shown in FIG. 2 and described herein. Variations in the specific structure shown in FIG. 2 are contemplated, but forming the cable restraint surfaces 24 out of the sides of the support channel 22, and thereby creating a pair of perpendicular support surfaces is the preferred embodiment of the present invention. A support channel 22 may be formed such that a single cable restraint surface 24 results and this configuration may be suitable, or even desired, in some situations. The invention, therefore, is not limited to devices with a pair of cable restraint surfaces 24.

The cable restraint surfaces 24 are formed so that their upper surfaces are approximately flush with the upper surface 34 of the rung 18. This configuration allows the cable restraint surfaces 24 to engage the lower surface of the cables 12 and thus securely attach to both the rung 18 and the cables 12.

The base 20 shown in FIG. 2 also includes four bolts 30 that extend from the lower side of the base 20. Restraining washers 32 are used to hold the bolts in place during installation of the device 10. The bolts 30, therefore, remain secure as the cap 40 is positioned over the base 20. The cap 40 may have radial reinforcing ribs 42 to provide additional physical strength. The cap 40 is secured to the base using nuts 44 that are threaded onto the bolts 30. Reinforcing straps 46 may be used, extending around the cap 40 from the one bolt 30 to another. The straps 46 may be made of metal (e.g., stainless steel), carbon fiber, or any other suitable material that provides both flexibility and strength.

The interior side of the cap 40 is shaped to curve around the cables 12, thus forming a cable restraint channel 47. In the configuration shown in FIG. 2, the device 10 is made for use with a trefoil cable run 12. The cap 40, therefore, is curved to match the upper part of the single top cable of the trefoil and a portion of the upper surfaces of the lower two cables. Internal ribs 48 may be used to better secure the device 10 to the cables 12. Restraining washers (not shown) may be used in the cap 40, so that when the cap 40 is pushed on the bolts 30, the cap 40 and base 20 are held together while the nuts 44 are tightened. This configuration makes assembly and installation easier.

The connection of the base 20 to the cap 40 is direct. That is, there are no other structural elements of the cable retention device positioned between the base 20 and cap 40. When the nuts 44 are tightened onto the bolts 30, the base 20 and cap 40 are pulled together. The base 20 and cap 40 need not come into physical contact with each other (allowing for some separation between these two primary structural members allows the device to be used with a wider range of cable sizes), but there are no other structural parts of the device between the base 20 and cap 40. Only the rung 18 and cables 12 are positioned between the base 20 and cap 40. This configuration is what is meant by a direct connection between the base 20 and cap 40.

It is expected that the device of the present invention will be manufactured in a variety of sizes because the electrical cables to be secured vary in diameter from about 5 mm to about 150 mm or larger. When groups of these cables are positioned in the trefoil arrangement, the height and width of the cable arrangement can vary significantly, thus requiring a variety of different sized devices. The present invention, however, allows for a substantial range of use because the base 20 and cap 40 need not be tightened to the point of being in physical contact with each other. If the base 20 securely engages the rung 18 and the lower surface of the cables 12, while the cap 40 securely engages the upper surface of the cables 12, a secure connection will result, even if the base 20 and cap 40 are not in physical contact with each other.

The bolts 30, restraining washers 32 and nuts 44 are but one of many possible means for securing the cap 40 to the base 20. This structure is preferred because it produces a secure connection between the cap 40 and base 20 using simple and widely-understood technology. But alternative means are also included within the scope of the invention. For example, straps or bands could be used that extend around the cap 40 and base 20, with the straps tightened in any suitable manner. Straps or bands could be tightened using a ratcheting mechanism, or could be tightened by twisting the straps or bands.

Alternatively, a ratcheting member could be used in place of the bolts 30. For example, rather than threads, as would be used with the bolts 30, studs having radial teeth could be used, such that the studs engage ratcheting fingers or other retaining members. A ratcheting mechanism could be used to ratchet down the cap 40 onto the base 20 in a manner similar to that used on some automobile jacks or the bindings of some snow skiing boots, cycling shoes, or other common devices that use ratcheting assemblies for tightening purposes. The range of means that could be used to secure the cap 40 and base 20 is almost endless. As long as a secure connection is made, one that is sufficiently tight to restrain the cables together and to the rung of a cable support structure, the particular means used to make the connection is not a limiting element of the present invention.

The base 20 and cap 40 are preferably made of rigid material, such as a thermoplastic or thermoset resin material, steel, aluminum, or other suitable material. Reinforcing materials, such as glass fiber, carbon fiber, boron fiber, or the like, may be used with thermoplastic or thermoset materials to provide additional physical strength. The invention is not dependent upon the type of material used, so long as the material is sufficiently strong and may be manufactured at a reasonable cost. It is expected that the base 20 and cap 40 may be manufactured using injection molding of a thermoplastic or thermoset material.

Figure 3:
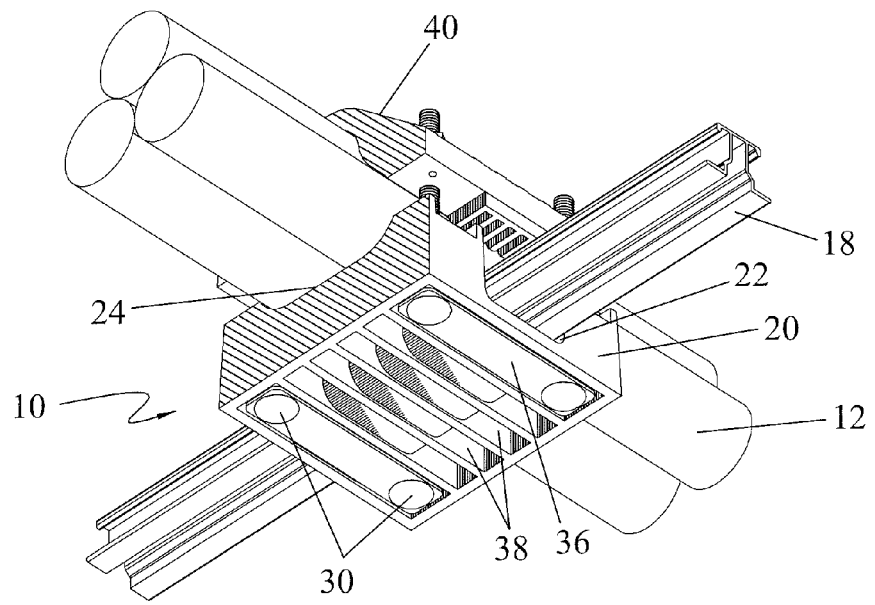
FIG. 3 is an alternative isometric view of an embodiment of the present invention.

FIG. 3 presents the device 10 attached to a rung 18 and trefoil arrangement of cables 12. A lower perspective view is provided, and the underside of the base 20 is visible. The heads of the bolts 30 are seen at the corners of the base 20. Base reinforcing straps 36 are shown extending between pairs of bolts 30. Reinforcing ribs 38 are also shown. The support channel 22 and the cable restraint surfaces 24 cannot be directly seen in this drawing, but the perpendicular arrangement of these elements is again clear. The cap 40 is shown attached to the base 20 and positioned above the cables 12 and the rung 18.

Figure 4:
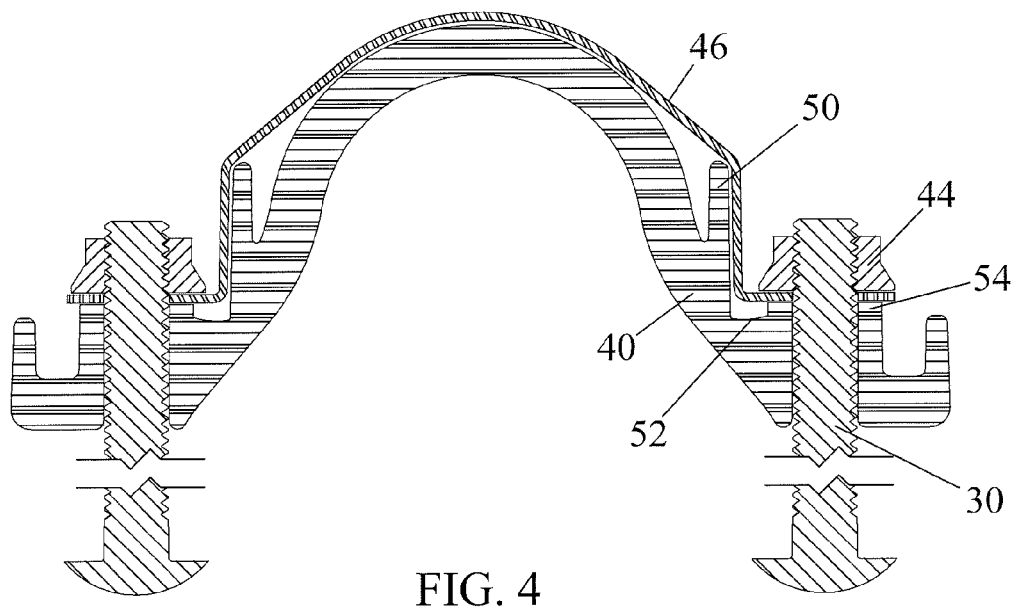
FIG. 4 is a cross-section view of a cap in accordance with an embodiment of the present invention.

A cross sectional view of an embodiment of the cap 40 is provided in FIG. 4. The bolts 30 and nuts 44 are shown securing a reinforcing strap 46. In this embodiment, longitudinal reinforcing ribs 50 are used. These ribs extend along the axis of the cables 12 (not shown) to be secured by the device. The bolt 30 extends through a flange 52 and a bolt support pedestal 54. The reinforcing strap 46 extends over the rib 50 and is then secured by the nut 44.

Figure 5:
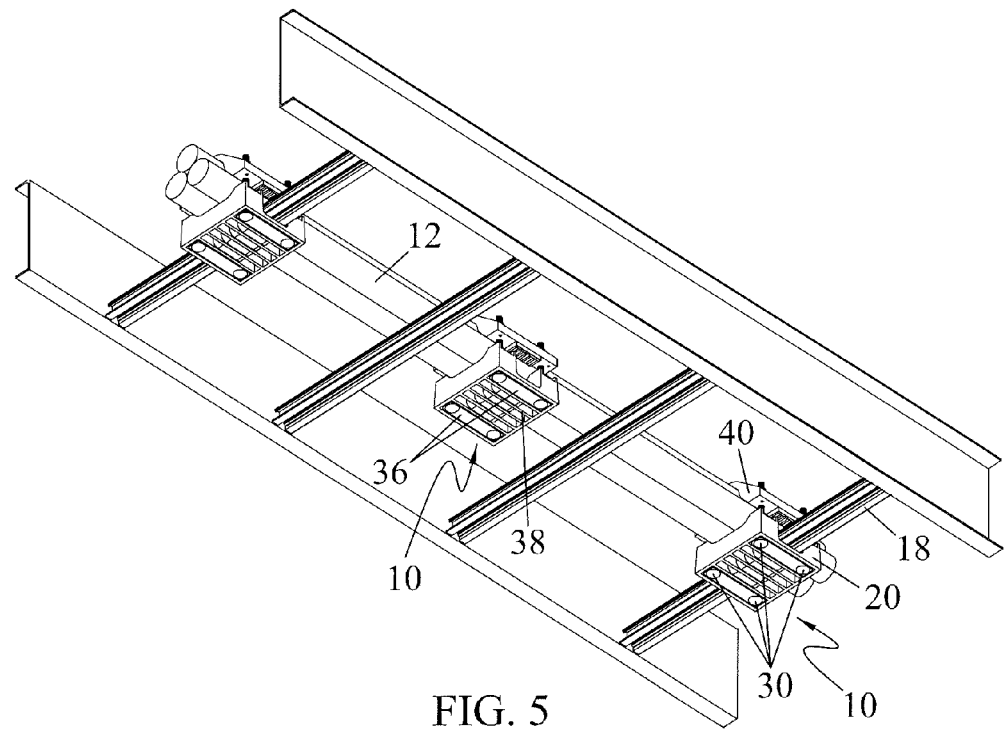
FIG. 5 is an isometric view of the same embodiment shown in FIG. 1, but from a different perspective.

FIG. 5 shows the cable retention device 10 of the present invention in the same arrangement illustrated in FIG. 1. The view in FIG. 5 is from below the cable support structure, and thus provides a better view of the lower side of the base 20. The cap 40 is also visible, but the particular features of the cap 40 are hidden in this drawing. Four bolts 30 are seen at the corners of the base 20. Base reinforcing straps 36 extend between pairs of bolts 30. Reinforcing ribs 38 are also shown. The cable retention devices at the far right and far left are shown secured to both the cables 12 and a rung 18. The center device is shown securing the cables 12 alone. The device of the present invention may be used in either manner.

Figure 6:
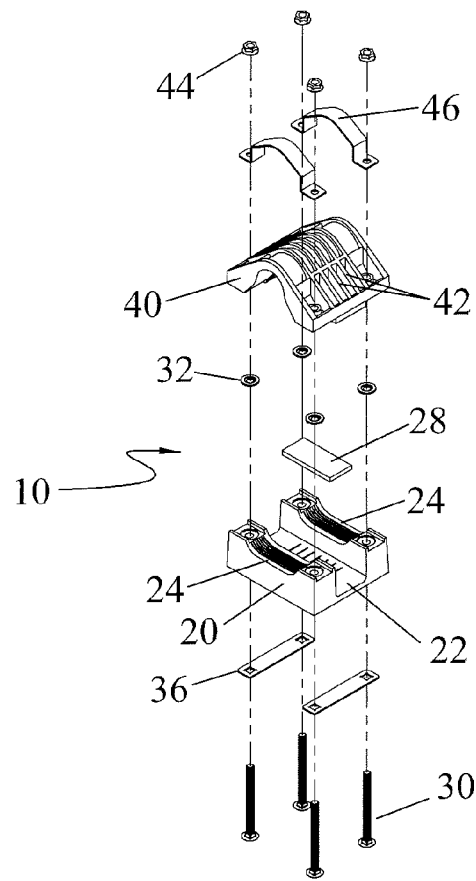
FIG. 6 is an exploded parts view of certain elements of a preferred embodiment of the present invention.

FIG. 6 is an exploded view showing key components of an embodiment of the cable retention device 10 of the present invention. The base 20 is shown with its integral support channel 22 and the pair of cable restraint surfaces 24 positioned perpendicular to the axis of the support channel 22. Four bolts 30 are shown, as are a pair of base reinforcing straps 36. It can be seen in FIG. 6 that the reinforcing straps 36 extend across the axis of the support channel 22, which is preferred. Restraining washers 32 are used to retain the bolts 30 in the base 20. A sizing pad 28, which may be positioned within the support channel 22 to accommodate different sized rungs 18 (not shown), is also shown.

The cap 40 shown in FIG. 6 includes a pair of reinforcing straps 46 and a series of radial reinforcing ribs 42. Nuts 44 are used to engage the threaded ends of the bolts 30, thereby securing the cap 40 to the base 20.

Figure 7:
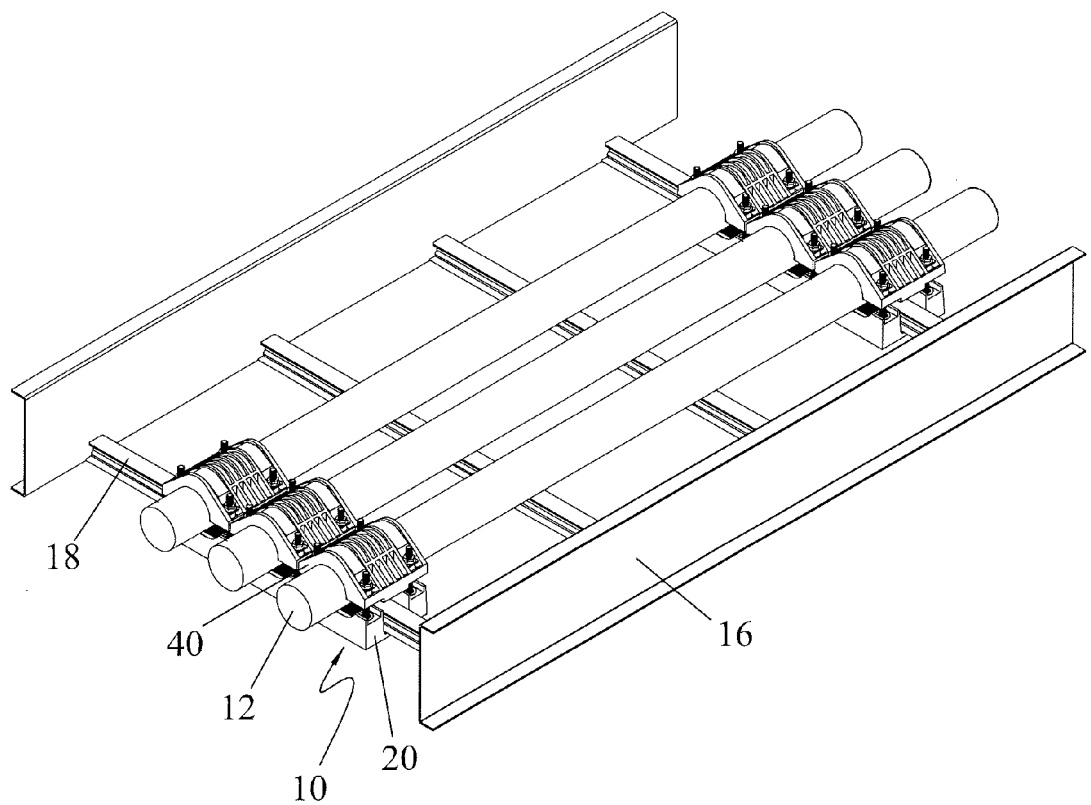
FIG. 7 is an isometric view showing use of the present invention in an alternate cable arrangement.

An alternate cable arrangement is shown in FIG. 7. A group of three cables 12 are shown separated, rather than in the trefoil arrangement shown in some previous drawings. The cable retention device 10 of the present invention may be used in this arrangement, as well as any other arrangement of cables. A section of the physical cable support structure is shown with large side rails 16 and rungs 18. The device 10 of the invention is shown attached to rungs 18 in FIG. 7. There is no need, of course, to secure the cables 12 to each other in the arrangement shown in FIG. 7. Indeed, the opposite is needed in this arrangement, as the cables 12 must be secured to the rung 18 to maintain physical separation between the cables 12. The cable retention devices 10 shown in FIG. 7 are of the same construction shown in prior drawings. The base 20 and cap 40 are clearly shown in FIG. 7.

Figure 8:
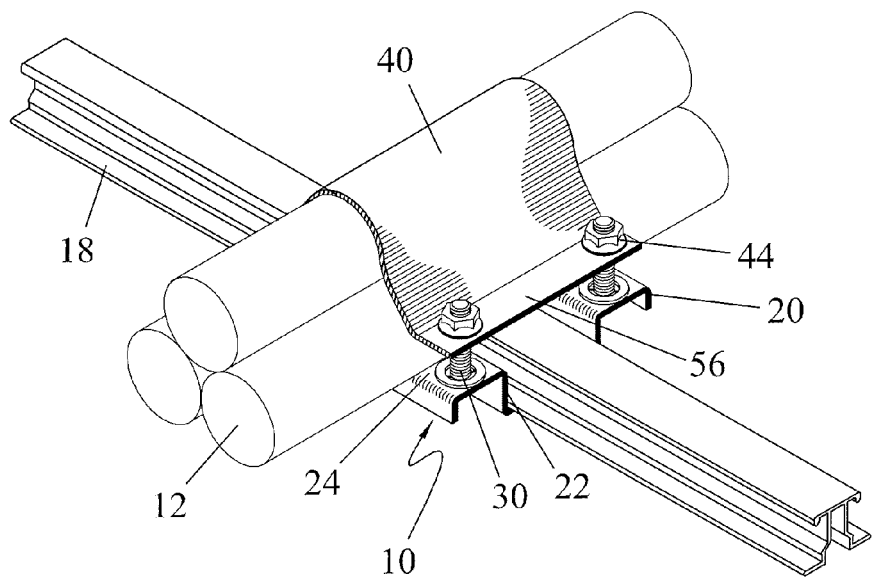
FIG. 8 is an isometric view of an alternate embodiment of the present invention.

The present invention may take a variety of forms. The base 20 and cap 40 may be constructed of a relatively thin material shaped to fit the contours of the rungs 18 and the cables 12. In FIG. 8, an alternative embodiment is shown where the cap 40 is made of a relatively thin material shaped to fit the contour of the upper portion of a trefoil cable arrangement. The cap 40 shown in FIG. 8 could be made of flexible material in the form of a wide strap that bends around the cables 12. A reinforcing strap 56 may be used between the bolts 30, extending along the axis of the cables 12. Such a strip may distribute the force of the bolt 30 and nut 44 arrangement along a larger area of the cap 40.

The base 20 shown in FIG. 8 is made of a relatively thin, but rigid material. For example, a metal could be used, and could be stamped into the shape shown in FIG. 8. The base 20 has a support channel 22 with three sides that engage the rung 18. It also has a pair of cable restraint surfaces 24 perpendicular to the axis of the support channel 22, such that the cable restraint surfaces 24 engage the lower side of the cables 12 when the device 10 is fully assembled. The embodiment shown in FIG. 8 is simpler than that shown in other drawings, but it may not have the same physical strength. In applications where less strength is required, the embodiment illustrated in FIG. 8 may result in a lower cost device that provides some of the key benefits of the present invention.

The preceding description of the invention is meant to identify the invention without limiting the specific details of construction of the system or specific steps of the method. It is to be understood by those of skill in the art that minor variations on the disclosed configurations are within the scope of the invention, and all such variations are not described in detail here because those of skill in the art are fully familiar with such variations. For these reasons, this description is meant to identify and describe the present invention, and should not be read as limitations on the invention.

I claim:

1. A cable retention device for restraining one or more insulated electrical cables positioned upon a physical cable support structure, comprising:
   a. a base having a support channel configured for engagement with a physical cable support structure and a pair of cable restraint surfaces aligned along a longitudinal axis of the one or more insulated electrical cables, such that the cable restraint surfaces are generally perpendicular to the support channel and are configured for simultaneous contact with the one or more insulated electrical cables;
   b. a cap configured to extend around a portion of one or more insulated electrical cables; and,
   c. a means for securing the base directly to the cap.

2. The device of claim 1, wherein the means for securing the base directly to the cap comprises a plurality of bolts and nuts.

3. The device of claim 1, wherein the pair of cable restraint surfaces are formed out of top surfaces of two sides of the support channel.

4. The device of claim 1, wherein the cable restraint surfaces further comprise ribs extending in a direction generally perpendicular to the longitudinal axis of the insulated electrical cables.

5. The device of claim 1, wherein the cap further comprises reinforcing straps and radial reinforcing ribs.

6. A cable retention device for restraining one or more insulated electrical cables positioned upon a physical cable support structure, the device comprising:
   a. a base configured to be positioned below the one or more insulated electrical cables and the physical cable support structure, the base further comprising
      i. a support channel configured to engage a rung of the physical cable support structure, the support channel and rung being generally perpendicular to a longitudinal axis of the one or more insulated electrical cables, and,
      ii. one or more cable restraint surfaces configured to engage a lower surface of the one or more insulated electrical cables, the one or more cable restraint surfaces being formed out of a top surface of one or more sides of the support channel;
   b. a cap configured to be positioned above the one or more insulated electrical cables and to engage an upper surface of one or more of the insulated electrical cables; and,
   c. a means for securing the base directly to the cap.

7. The device of claim 6, wherein the means for securing the base directly to the cap comprises a plurality of bolts and nuts.

8. The device of claim 6, wherein the one or more cable restraint surfaces further comprises a pair of cable restraint surfaces.

9. The device of claim 8, wherein the pair of cable restraint surfaces further comprise ribs extending in a direction generally perpendicular to the longitudinal axis of the one or more insulated electrical cables.

10. The device of claim 6, wherein the cap further comprises reinforcing straps and radial reinforcing ribs.

11. The device of claim 6, wherein the cap further comprises internal ribs extending in a direction generally perpendicular to the longitudinal axis of the one or more insulated electrical cables.

12. The device of claim 6, wherein the base further comprises base reinforcing straps and reinforcing ribs.

13. The device of claim 7, further comprising a restraining washer positioned upon each of the plurality of bolts and configured to retain each of the plurality of bolts within the base during installation of the device.

14. The device of claim 6, wherein the support channel further comprises a sizing pad.

15. A method of connecting a cable retention device to one or more insulated electrical cables, comprising:
   a. positioning a base of the cable retention device below a rung of a cable support structure such that the base engages the rung and simultaneously engages a lower surface of the one or more insulated electrical cables wherein the base has a support channel that is generally perpendicular to a longitudinal axis of the one or more insulated electrical cables;
   b. positioning a cap of the cable retention device above the one or more insulated electrical cables;
   c. connecting the base directly to the cap such that the base securely engages the rung and the lower surface of the one or more insulated electrical cables and the cap simultaneously securely engages the upper surface of one or more of the insulated electrical cables.

16. The method of claim 15, wherein the step of connecting the base directly to the cap further comprises tightening a plurality of nuts to a plurality of bolts.

17. A method of connecting a cable retention device to two or more insulated electrical cables, comprising:
   a. positioning the two or more insulated electrical cables as a single group, such that the cables are in physical contact with each other;
   b. positioning a base of the cable retention device below the single group of insulated electrical cables, wherein the base has a plurality of bolts extending outwardly and has a pair of cable restraint surfaces that simultaneously contact at least two of the insulated electrical cables, wherein the base has a support channel that is generally perpendicular to a longitudinal axis of the two or more insulated electrical cables;
   c. positioning a cap of the cable retention device above the single group of insulated electrical cables and over the base such that a plurality of openings in the cap are placed over the plurality of bolts extending outwardly from the base;
   d. attaching a plurality of nuts to the ends of the bolts extended through the openings in the cap;
   e. tightening the nuts to the bolts to secure the cap directly to the base.

18. The method of claim 17 further comprising the step of securing the device and the single group of insulated electrical cables to a wall or other permanent structure.

\* \* \* \* \*